Figure 1:
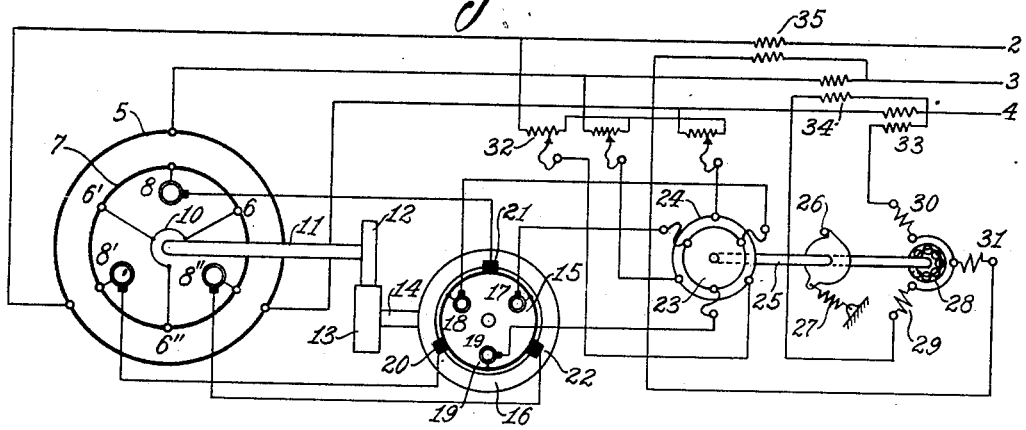

Oct. 26, 1926.

V. A. FYNN 1,604,902

ASYNCHRONOUS MOTOR

Filed Dec. 16, 1925   2 Sheets-Sheet 1

Inventor:
VALÈRE ALFRED FYNN,
By John N Kruminga
His Attorney.

Oct. 26, 1926.
V. A. FYNN
1,604,902
ASYNCHRONOUS MOTOR
Filed Dec. 16, 1925    2 Sheets-Sheet 2
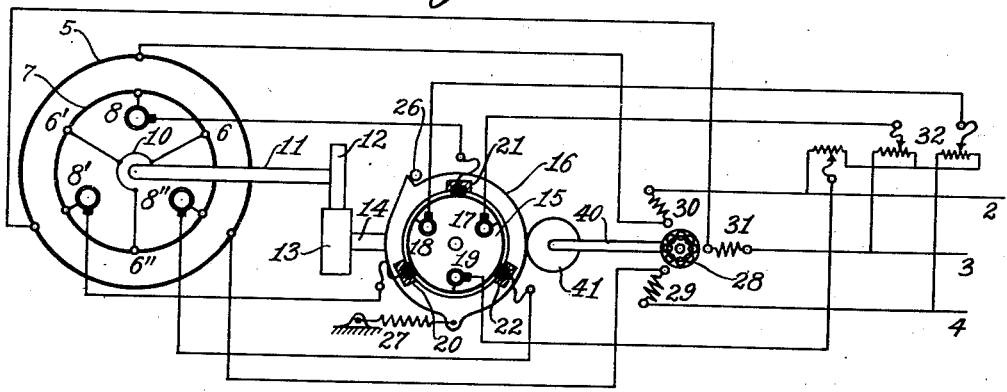
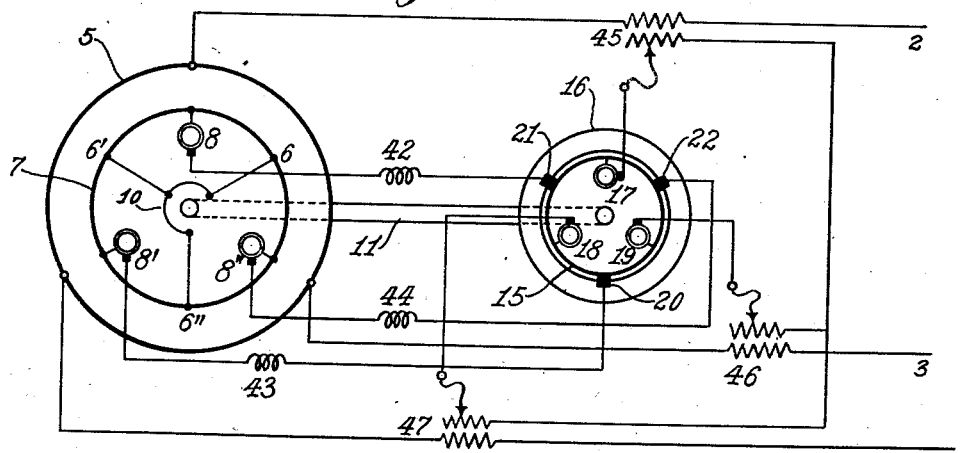
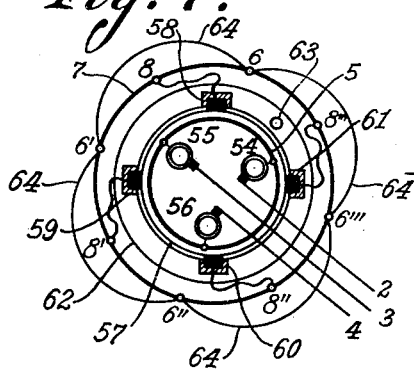
Inventor:
VALÈRE ALFRED FYNN,
By John H. Bruninga
His Attorney.

Patented Oct. 26, 1926.

1,604,902

UNITED STATES PATENT OFFICE.

VALÈRE A. FYNN, OF ST. LOUIS, MISSOURI.

ASYNCHRONOUS MOTOR.

Application filed December 16, 1925. Serial No. 75,680.

My invention relates to asynchronous induction motors and particularly to the improvement or control of the power factor or to the phase compensation of polyphase motors of this type.

Generally speaking, in accordance with my invention I provide a single winding on the secondary member of such motors and contrive preferably independently controllable and polyphase load and exciting circuits through this single secondary winding, cause load or working voltages to be induced or generated in these load and exciting circuits, introduce exciting voltages into the exciting circuits for the purpose of producing from the secondary at least part of the revolving field or flux usually produced by the primary of such motors, and control the working or load currents in the exciting circuits independently of the working or load currents in the load or working circuits of the secondary. I may further provide means for controlling the working currents in the exciting circuits independently of the exciting currents in said circuits preferably opposing the formation of working currents in the exciting circuits and I may practically exclude all working currents from the exciting circuits at one or more loads or even at all loads thus maintaining the currents in the exciting circuits approximately constant irrespective of motor load variations. I can also provide means for controlling the exciting currents.

In one way of carrying my invention into practice I close a single secondary and preferably distributed winding along a plurality of working axes per pole pair, as is usual in polyphase induction motors, and provide such regulating means in these working circuits as are necessitated by the duty for which the motor is intended. I further introduce into this same winding exciting currents along a plurality of exciting axes displaced from the working axes, providing the necessary means to cause the exciting currents as they appear in the single winding on the secondary to have such periodicity and phase as will cause said exciting currents to produce from the secondary a magnetization of same speed, axis and direction in space but not necessarily of the same magnitude as the magnetization capable of being produced by the primary of the motor. I prefer to introduce the exciting currents at the neutral points of the working circuits. I may derive my exciting voltages from the supply, either directly or indirectly, in which case I provide frequency converting means in the exciting circuits to change the exciting voltages and currents from line to secondary frequency. I can derive these exciting voltages from the supply and convert them either through elements integral with the motor or independent therefrom. To oppose the formation of working currents in the exciting circuits I may make the impedance of the latter per working volt generated therein greater than the impedance of the working circuits per working volt generated in said working circuits, or I may introduce into the exciting circuits other voltages of proper periodicity, phase and direction to oppose the working voltages generated in the exciting circuits, preferably deriving these other voltages from the same source as the exciting voltages, or I may combine two or more of such means. I may vary these working-voltage-opposing voltages with changing motor load. In other words I may introduce auxiliary voltages into the exciting circuits said auxiliary voltages each having one component suitable for contributing to the production of the desired secondary exciting currents and another component suitable for contributing to opposing the formation of secondary working currents in the exciting circuits. By varying the phase or magnitude or both the phase and the magnitude of these auxiliary voltages I can keep the exciting component constant and vary the other or vice versa or I can vary both components of said auxiliary voltages. Very advantageous conditions are secured when the currents in the exciting circuits are kept approximately constant for a plurality of motor loads and at values which yield a desirable power factor characteristic.

One advantage of reducing or entirely eliminating the working currents in the exciting circuits at one or more loads resides in the possibility thus afforded of reducing the size and therefore the cost of the elements comprised within the exciting circuits outside of the secondary winding. Another advantage of this invention is that with relatively light exciting circuits external to the secondary winding, the copper on the secondary of the motor can be utilized to the best advantage thus reducing the active material to a minimum and increasing the weight efficiency of the machine for a given conversion efficiency.

Throughout this specification the expression "exciting circuits" is intended to cover the complete exciting circuits from the source of the exciting or of the auxiliary voltages to and including the winding conductors on the secondary which carry the secondary exciting currents, in case frequency converting means are used the circuits on the low as well as on the high frequence sides of such converting means are of course included in the expression "exciting circuits".

All the objects and features of this invention will more clearly appear from the detailed description taken in connection with the accompanying drawings and will be pointed out in the claims.

Figure 4:
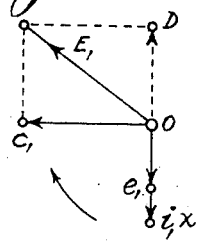
Figure 6:
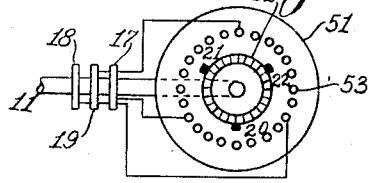

In the accompanying diagrammatic two-pole drawings, Figs. 1, 2, 3, 5, 7 show several embodiments of my invention. Fig. 6 is an exciter capable of use instead of the exciter shown in Fig. 5 and Figs. 4 and 8 are explanatory diagrams.

Referring to Fig. 1 which illustrates a three-phase asynchronous motor with independent or external exciter, the primary of the asynchronous motor, here the stator, is provided with an ordinary three-phase winding 5 connected to the three-phase supply 2, 3, 4 with the interposition of the series transformers 33, 34, 35. The secondary of this motor, here the rotor, carries a single distributed winding 7 short circuited along three axes per pole pair at the points 6, 6', 6'' and connected along other axes to a three phase arrangement of slip rings 8, 8', 8''. Adjacent shortcircuited points and adjacent slip ring connections are displaced by 120 electrical degrees. The shortcircuited points are displaced by 60 electrical degrees from the points connected to the slip rings. The working circuits are those determined by the shortcircuits 6, 6', 6'', the exciting circuits are those which include the slip rings 8, 8', 8'' and these slip rings are connected to the winding 7 at the neutral points of the working circuits in that winding. A two-pole exciter, the armature of which is provided with a commuted winding 15 connected to a commutator with which co-operates a polyphase arrangement of brushes 20, 21, 22 and also connected to a polyphase arrangement of slip rings 17, 18, 19, is mounted on the shaft 14 and is driven from the shaft 11 of the asynchronous motor by means of the gear wheels 12 and 13 which are of same pitch diameter because the number of poles in the asynchronous motor and its exciter is the same in this example. The brushes 20, 21, 22 co-operating with the commuted winding of this frequency converter used as an exciter are connected to the slip rings 8, 8', 8'' of the asynchronous motor and the slip rings 17, 18, 19 of the exciter are connected to the supply through the induction phase regulator 23, 24 the primary of which is connected to the supply through the adjustable ratio three-phase transformer 32. The armature of the frequency converter is surrounded by a stationary laminated structure 16, separated from the armature 15 by a short air-gap and preferably devoid of defined polar projections. Normally the movable member 23 of the induction regulator is under the control of the spring 27 which holds 23 in a position determined by the stop 26, which co-operates with a suitable projection on a disc mounted on the shaft 25 which carries the movable member 23. This same shaft also carries the squirrel cage rotor 28 of a three-phase motor which here acts as a relay and the primary windings 29, 30, 31 of which are connected in star and to the star connected secondaries of the series transformers 33, 34, 35. The connections are so made that with increasing current in the primary of the asynchronous motor the relay 28 exerts a torque which tends to overcome the spring 27 and move the member 23 of the induction regulator in a clockwise direction. A movement of 23 changes the phase of the voltages impressed on the slip rings of the exciter and thus changes the phase of the auxiliary voltages appearing at the brushes 20, 21, 22 whenever said exciter revolves at a speed which differs from its asynchronous speed. This is one way of changing the phase of the auxiliary voltages impressed on the secondary exciting circuits of the asynchronous motor. The magnitude of these voltages can be changed by means of the adjustable shunt three-phase transformer 32. The brushes 20, 21, 22 co-operating with the commuted winding 15 of the exciter are supposed to rest directly on said winding which is represented by a plain circle. In practice the brushes in question would co-operate with a commutator connected to said commuted winding. The phase of the auxiliary voltages in the low frequency part of the exciting circuits can also be changed by displacing the brushes 20, 21, 22.

Figure 2:
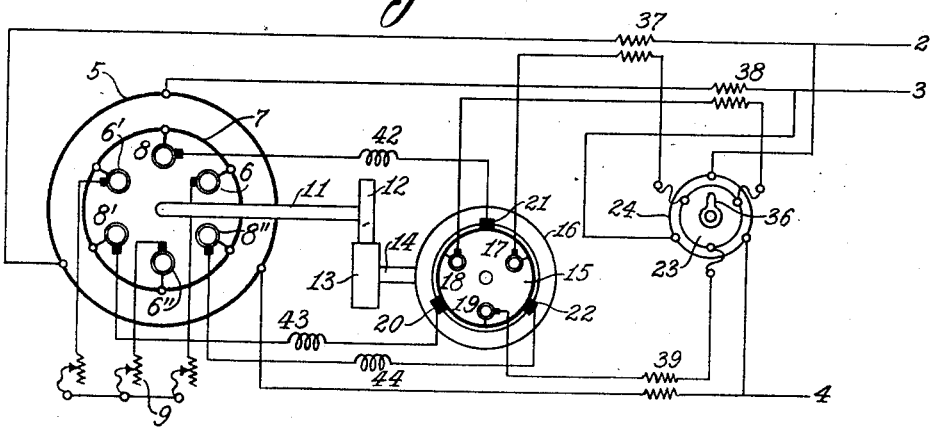

In Fig. 2 the stator of the asynchronous motor is provided with a three-phase winding 5 and its rotor or secondary carries a single distributed winding 7 connected to six slip rings, adjacent ones being displaced by 60 electrical degrees. The slip rings 6, 6', 6'' determine the working and the slip rings 8, 8', 8'' determine the exciting circuits of the secondary. The working circuits can be adjusted or regulated, at starting or at other times, by means of the adjustable resistances 9 connected to the slip rings 6, 6', 6'' while independent controlling means are provided for the exciting circuits. The armature of the frequency converter, here used as an exciter, is mounted on the shaft 14 driven by means of the gear wheels 12 and 13 from the shaft 11 of the asynchronous motor. The armature of this exciter is provided with a commuted winding 15 with which co-operates a three-phase arrangement of slip rings 17, 18, 19. The armature 15 is surrounded by a stationary laminated body 16 separated from the armature by a short air-gap and devoid of polar projections. The commutator brushes 20, 21, 22 are connected to the exciting circuits of the asynchronous motor by way of the impedances 42, 43, 44, the slip rings 8, 8', 8", and brushes co-operating with same. The slip rings 17, 18, 19 of the exciter are connected to an induction phase regulator 23, 24 with the interposition of the secondaries of the variable positive reactances 37, 38, 39 shown here in the form of series transformers, the primaries of which are included between the supply 2, 3, 4 and the terminals of the primary 5 of the asynchronous motor and the secondaries of which are located in the exciting circuits between the phase regulator and the slip rings of the exciter. The position of the movable member 23 of the induction regulator can be changed with the help of the handle 36. From the viewpoint of expense the impedances 42, 43, 44, when located in the low frequency circuits, are preferably devoid of reactance and are pure ohmic resistances but positive reactance is always the better from the technical viewpoint.

Referring to Fig. 3, the construction of the asynchronous motor is here identical with that described in connection with Fig. 1. The single winding 7 on the secondary can be described as a six phase mesh connected polyphase winding alternate phases of which are shortcircuited at 10 to form a three-phase shortcircuited working winding while the remaining three-phases are connected to the slip rings 8, 8', 8" to form a three-phase exciting winding. The frequency converter used as an exciter is driven as in the previous figures, but while its armature is identical in design, the commutator brushes 20, 21, 22 co-operating with the commuted winding 15 are arranged to be moved or shifted circumferentially during the operation of the asynchronous motor. To this end said brushes are insulatingly carried by the laminated structure 16, or by some other similar means and are normally under the control of the spring 27, which holds said brushes in a position determined by the stop 26 co-operating with a suitable projection on the brush rocker arm 16. The brushes 20, 21, 22 are connected to the exciting circuits of the asynchronous motor through the slip rings 8, 8', 8" as in the other examples. The slip rings 17, 18, 19, of the exciter are connected to the mains 2, 3, 4 by means of the three-phase shunt transformer 32. A three-phase relay, the squirrel cage rotor 28 of which is adapted to co-operate with the laminated structure 16, here used as a brush rocker arm, through the shaft 40 and the gear wheel 41, is provided with primary windings, 29, 30, 31 which are connected to the supply 2, 3, 4 in series with the primary winding 5 of the asynchronous motor. With increasing current in the primary 5, the squirrel cage rotor 28 exerts an increasing clockwise torque, overpowers the spring 27 and moves the brushes 20, 21, 22 in a counterclockwise direction, this movement increasing with the load on the asynchronous motor.

In Fig. 5 the primary of the asynchronous motor carries the primary three-phase winding 5 and the secondary the single distributed winding 7, three points 6, 6', 6" of this winding are shortcircuited to form the working circuits of the secondary, adjacent shortcircuited points being displaced by 120 electrical degrees. Three other points connected to the three-phase arrangement of slip rings 8, 8', 8" are also displaced by 120 electrical degrees from each other and by 60 electrical degrees from the shortcircuited points, they are located intermediately of the shortcircuited points and determine the exciting circuits on the secondary. They are connected to the brushes 20, 21, 22 co-operating with the commuted winding on the armature of a frequency converter used as an exciter. The expression intermediately is here used in the electrical and not the mechanical sense. Impedances 42, 43, 44, which are preferably ohmic resistances when located in the low frequency parts of the exciting circuits, are inserted between the slip rings 8, 8', 8" and the brushes 20, 21, 22. The commuted winding 15 of the exciter is also connected to a three-phase arrangement of slip rings 17, 18, 19 and through these is placed in series relation with the primary 5 of the asynchronous motor by way of the adjustable ratio series transformers 45, 46, 47. The rotor of the frequency converter is surrounded by a stationary and preferably laminated member 16 which reduces the magnetizing current required by this apparatus.

In Fig. 6 is shown a modification of the exciter of Fig. 5. The stationary member 16 is omitted a single laminated body 51 being used. The winding 15 connected to the commutator 52 is located in holes 53 placed well back of the outer periphery of the laminated body 51, thus entirely imbedding this winding in the laminations. The commuted winding 15 is as before, connected to the slip rings 17, 18, 19 carried by the shaft 11. This arrangement is equivalent to causing the element 16 of the exciter of Fig. 6 to revolve with its rotor and to eliminating the air gap between the two.

In Fig. 7 the invention is applied to an asynchronous motor in which the exciter is embodied in the motor and in which the frequency of the exciting currents is changed from line to slip frequency within the machine itself. The primary member is the rotor and carries a three-phase winding 5 connected to the supply 2, 3, 4 by means of the slip rings 54, 55, 56 and co-operating brushes. The primary also carries a commuted winding 57 co-operating with the stationary two phase or quarter phase arangement of brushes 58, 59, 60, 61 insulatingly held in the brush rocker arm 62 adapted to be moved circumferentially by means of the handle 63. The stator carries a single distributed winding 7. Four electrically equidistant points 6, 6', 6'', 6''' of 7 are shortcircuited by means of the conductors 64, and determine the working circuits of the secondary. Four other electrically equidistant points 8, 8', 8'', 8''' are connected to the brushes 58, 59, 60, 61 co-operating with the primary. Adjacent shortcircuited points are displaced by 90 electrical degrees and so are adjacent points connected to the brushes 58, 59, 60, 61. The brush connected points are, in the electrical sense, intermediately located with respect to the shortcircuited points of the single secondary winding. The two sets of points are displaced by 45 electrical degrees or by half the pitch or displacement of adjacent points of either set or group of secondary points. Here, as in all other cases, the brushes cooperating with the commuted winding are shown as resting directly on said winding, in practice they would rest on a commutator connected to the commuted winding.

It will be understood that while the invention has been shown as applied to three-phase asynchronous induction motors, it is applicable to polyphase machines of this type regardless of the number of phases for which they are wound and is therefore equally applicable to a two-phase machine. The number of phases in the secondary working and exciting circuits need not be the same as the number of phases in the primary winding and can be greater or smaller at the option of the designer. While for the sake of simplicity the frequency converter used as an exciter, as well as the asynchronous motor, have been shown throughout as two-pole machines, in practice the asynchronous motor will usually be wound for more than two poles, and generally speaking, the number of poles of the exciter will differ from the number of poles of the asynchronous motor and will usually be considerably less than that of the latter. Under such conditions, the pitch diameter of the gear wheels 12 and 13 will not be the same, but will differ in the ratio of the number of poles of the two machines and must be so chosen that when the asynchronous motor runs synchronously the exciter or frequency converter also runs synchronously. While an induction regulator has been shown in some cases for the purpose of changing the phase of the voltages impressed on the slip rings of the exciter, yet it will be understood that the same object can be achieved by well known combinations of adjustable ratio static transformers.

Turning now to the mode of operation of the various embodiments here described and referring at first more particularly to Fig. 1, the polyphase asynchronous motor there shown can be started in any desired and known manner. During the starting operation the exciting circuits controlled by the slip rings 8, 8', 8'' may be interrupted or not as desired. This exciter may, during this period, be connected to the supply or not. The asynchronous motor is capable of normal operation without the help of the exciter, but if it is desired to improve or control the power factor of the asynchronous motor, then the exciter should be connected as shown.

If both working and exciting circuits of the secondary winding 7 are closed then both will carry working currents because working voltages are generated in each. With the arrangement of said circuits illustrated in Fig. 1 the working voltages generated in one set of polyphase rotor circuits are always the same as the working voltages generated in the other set. If both are closed each will carry working currents but these will not be the same in the two circuits unless the impedances of said circuits are the same. Generally speaking it is the impedance of a circuit per volt generated in said circuit which counts in this connection. The working voltages in question are generated by a difference in speed between the revolving field or the basic magnetization of the motor and the conductors of the secondary. It is known that in machines of ordinary construction these working voltages are of a magnitude which is just sufficient to force the working currents through the impedance of the secondary circuits within which said voltages are generated, and it is further known that near synchronism the impedance of any secondary circuit of an ordinary asynchronous polyphase motor is very small and does not materially differ from the ohmic resistance of the circuit in question. In Fig. 1 the slip and therefore the magnitude of the working voltages will be determined in the main by the impedance of the short-circuited working circuits 6, 6', 6'' in case the impedance of the exciting circuits 8, 8', 8'' is made greater than that of the working circuits. Any increase of the impedance of the exciting circuits 8, 8', 8'' above the impedance of the working circuits will cause the latter to carry more of the working ampere turns than the former and most of those working ampere turns can thus be readily forced to flow in the working circuits.

When I desire to compensate a polyphase asynchronous motor such as that shown in Fig. 1, or to control its power factor, I introduce into each circuit of the secondary winding 7, which is to do duty as exciting circuit, a voltage leading the working voltage in that circuit by substantially ninety degrees. In Fig. 1 this relation of auxiliary to working voltage can be secured after the slip rings 8, 8', 8'' have been connected to the brushes 20, 21, 22 of the exciter, and regardless of the location of the commutator brushes, by connecting the primary 24 of the induction regulator to the mains 2, 3, 4 by means of the three-phase transformer 32 and then so locating the stop 26 that the auxiliary voltages of line frequency impressed by the movable member 23 of the induction regulator on the slip rings 17, 18, 19 of the exciter will have a phase such that the phase of the auxiliary slip frequency voltages appearing at the commutator brushes will have the desired quadrature leading phase relation to the working voltages generated in the exciting circuits of the secondary 7 to which the commutator brushes are connected. The phase of these auxiliary rotor exciting voltages having been properly selected, it only remains to suitably choose the magnitude of said voltages in order to achieve the desired phase compensation. If the magnitude in question is so selected that the revolving field produced by the exciting currents thus sent into the secondary 7 of the asynchronous motor is less in magnitude than the fundamental magnetization normally produced by the primary 5 of the asynchronous motor, then the power factor of the machine will be improved but will not reach unity. An increase in the magnitude of the voltages impressed on the slip rings of the exciter will cause an increase in the synchronously revolving field produced by the rotor and a corresponding decrease in the lagging magnetizing currents taken by the primary 5 of the asynchronous motor. Said primary magnetizing currents can in this manner be reduced to zero, whereupon a further increase of the voltages applied to the slip rings of the exciter will cause the primary 5 of the asynchronous motor to take leading currents and thus counterbalance or neutralize a part of the revolving field produced by the rotor. The remaining field now forms all of the basic or fundamental magnetization of the machine.

While thus operating this compensated machine, the exciting circuit of the secondary of the asynchronous motor may carry not only exciting currents due to the voltages introduced into this circuit by means of the commutator brushes 20, 21, 22 of the exciter, but may also carry a certain proportion of the secondary load currents, necessitating a correspondingly larger exciter and correspondingly larger associated apparatus.

When it is desired to entirely eliminate all load currents from the exciting circuit of the winding 7 at some particular load, then the phase of the auxiliary voltages of line frequency impressed on the slip rings of the converter-exciter must be so chosen that the commutator brush voltages introduced into the exciting circuits of the secondary 7 of the asynchronous motor shall lead the working voltages in said exciting circuit by substantially more than ninety degrees. Under these conditions, the auxiliary voltages E introduced into the exciting circuits of the secondary 7 may be each decomposed into two components, one of which leads the corresponding working voltage by about ninety, while the other leads it by about one hundred eighty degrees. The first of these may be referred to as the exciting component $c$ and the second as the load-current-opposing component $a$. When the load or the slip is such that the working voltage $e$ in each exciting circuit of 7 equals the component $a$ of the auxiliary voltage E in that circuit, then said circuit will carry exciting current only and no load current whatsoever. This change is easily accomplished in Fig. 1 by suitably moving the stop 26.

If it is desired to eliminate the load currents from the exciting circuits of the winding 7 of the asynchronous motor at all motor loads, then it is necessary to change the phase of the auxiliary voltages introduced into 7 from the exciter 15 with every change of load on the asynchronous motor. This can be done by hand by appropriately moving the member 23 of the induction regulator, but the relay 28, 29, 30, 31 performs this function automatically in Fig. 1. The stator windings of this relay are connected to the secondaries of the series tranformers 33, 34, 35 the primaries of which are connected to the supply 2, 3, 4 in series with the primary 5 of the asynchronous motor. The magnetization of this relay therefore increases with increasing load on the asynchronous motor, correspondingly increasing the torque exerted by the squirrel cage 28 of the relay, which torque overcomes the spring 27 and moves the member 23 of the induction regulator in the proper direction and through a suitable angle. But if the phase of the auxiliary voltages E is changed with changing motor load and without changing the magnitude of said voltages, then while the working voltages in the exciting circuits of the secondary 7 may be properly opposed or neutralized at each load, yet the exciting component $c$ of each auxiliary voltage E will decrease with increasing load thus reducing the compensation of the asynchronous motor. Should it be desired to keep the compensation of said machine constant, then it is necessary to increase the magnitude of the auxiliary voltages as their lead over the corresponding working voltages is increased and as is shown in the phase diagram of Fig. 8. In Fig. 1 this can be achieved by means of the adjustable three-phase transformer 32. Instead of using the phase regulator 23, 24 to adjust the phase of the auxiliary voltages impressed on the slip rings 8, 8', 8'' said phase can be adjusted by displacing the brushes 20, 21, 22.

Turning now to Fig. 2. This differs from Fig. 1 in that the induction regulator 23, 24 is connected directly to the supply 2, 3, 4 and further in that one winding of the three series transformers 37, 38, 39 acting as variable reactances is included in each exciting circuit between the secondary 23 of the induction regulator and the slip rings of the exciter armature 15, while the other winding of each of the series transformers is included in one of the primary circuits of the induction motor. The secondaries of those series transformers could, instead, be included in series with the primary of the phase regulator. Under the conditions shown in Fig. 2, the member 23 of the induction regulator delivers, when moved, voltages which vary in phase but not in magnitude and each of the series transformers 37, 38, 39 can be looked upon as a variable positive reactance in so far as the slip ring circuit of the exciter is concerned. Seeing that each exciting current injected into the exciting circuit of the secondary 7 by means of the exciter 15 is, near synchronism, practically in phase with each exciting voltage and that each of the latter leads by about ninety degrees the corresponding working voltage in 7, the working voltages in the winding 7 may be looked upon as positive reactance voltages in so far as the exciting current is concerned and since these working voltages increase with increasing load or slip, I have conceived the idea of including in the exciting circuit, and preferably in the line frequency part of the exciting circuit, other voltages which will have the same lagging phase relation with respect to the exciting currents as said working voltages, but which will diminish as the load or the slip increases. In this manner I can keep practically constant the sum of those voltages in the exciting circuit which lag about ninety degrees behind the exciting voltages. If I now impress on the exciting circuit auxiliary voltages of such magnitude and phase that one component of each of said voltages will about equal and oppose the sum of the working and of the positive reactance voltages while the other will lead said voltages by about ninety degrees, then whatever change may take place in the relative magnitude of the working voltages generated in the exciting circuits of 7 and the reactance voltages in said exciting circuits, such as the external positive reactances 37, 38, 39, will at all times leave the magnitude of the exciting voltage undisturbed and the working voltages equalled and opposed. The phase diagram of Fig. 4 illustrates this relation for one line frequency phase of the exciting circuit of the secondary 7 of the asynchronous motor. At the instant for which this diagram holds, the working voltage $e_1$ is twice as large as the reactance voltage $i_1 x$ absorbed in the corresponding series transformer. The auxiliary voltage $E_1$ impressed on this circuit has one component OD equal and opposed to the sum of $e_1$ and $i_1 x$ and another component $c_1$ leading $e_1$ by ninety degrees. Should the load on the asynchronous motor decrease, then $e_1$ decreases and since the primary current of the asynchronous motor also decreases and in practically the same proportion as $e_1$, then $i_1 x$ increases; the sum of the two, however, remains practically constant. In this way the working voltages are always opposed by part of the auxiliary voltages and the rotor excitation of the asynchronous motor which depends on the magnitude and phase of $c_1$ remains practically constant. Furthermore, while the auxiliary line frequency voltage as measured at the terminals of the movable element 23 of the induction regulator remains constant as to phase and magnitude, yet both phase and magnitude of the auxiliary voltage actually impressed on the slip rings of the exciter do change, the lead of the auxiliary voltage as measured at the slip rings and its magnitude, and consequently also the lead and magnitude of the slip frequency auxiliary voltage E, increase with increasing load as indicated in Fig. 8.

When the asynchronous motor is running light and there is practically no current in the high tension coils of the transformers 37, 38, 39 then the positive reactance of their low tension coils, which are in circuit with the slip rings of the exciter, is at a maximum. The reactance voltage in the low tension winding of each series transformer is $i_1 x$, where $i_1$ is the exciting current and practically constant and where $x$ is the reactance of the series transformer which varies with the current in the high tension winding thereof. This reactance will be a minimum when the currents in the two windings of each of the series transformers produce ampereturns which are equal in number and differ in phase by one hundred eighty degrees. This condition can readily be brought about by suitably locating the secondary 23 of the induction regulator by means of the handle 36. If the conditions are so chosen that the asynchronous motor is excited to operate with about unity power factor throughout, then the current in the primary 5 will be practically in phase with the line voltage. Furthermore if the conditions are so chosen that nothing but exciting current circulates in the exciting circuits of the secondary 7, then the phase relation of that current as reflected in the line periodicity part of the exciting circuit, which includes the movable member 23 of the induction regulator, will depend on the position of this movable member, in other words, on the phase of the voltages impressed on the slip rings of the exciter by the induction regulator. It follows that the movable member 23 of this induction regulator can always be so placed as to secure practical phase opposition or any other phase relation between the exciting current in the low tension winding and the primary load current in the high tension winding of each series transformer. But changing the phase of the voltages delivered by the secondary 23 of the induction regulator also changes the phase of the commutator brush voltage on the exciter and to bring this back to secure the desired quadrature relation between this commutator brush voltage and the generated working voltage in the exciting circuits of the secondary 7, it is only necessary to suitably displace the commutator brushes.

When in Fig. 2 the magnitude of the voltage delivered by the secondary 23 of the induction regulator is properly chosen, then the conditions outlined in connection with diagram of Fig. 4 can be readily secured by suitably locating this movable member 23 with relation to the primary member 24 and placing the commutator brushes 20, 21, 22 in the proper position on the commutator of the exciter so as to secure the desired phase relations within the exciting circuit of the secondary 7 of the asynchronous motor. In addition to this, the series transformers must, of course, be properly dimensioned as to number of turns and cross section of iron. When the said conditions are fulfilled, then the arrangement shown in Fig. 2 will keep the excitation of the asynchronous motor practically constant at all loads, and will at all times practically exclude all load currents from the exciting circuits of the winding 7 of the asynchronous motor. As a rule, the induction regulator will be set once for all when adjusting the machine and in such cases ordinary static transformers can be suitably combined and used instead of the induction regulator. This induction regulator or its substitutes can also be omitted and all adjustments made by moving the brushes 20, 21, 22 of the exciter.

The degree of necessary accuracy in the adjustments connected with the variable impedances, in order to exclude practically all load currents from the exciting circuits at all motor loads, can be materially reduced by including other impedances such as 42, 43, 44 in the exciting circuits. These additional impedances need not be adjustable and can be simple ohmic resistances particularly if included in the low frequency parts of the exciting circuits. If included in the high frequency parts of the exciting circuits, say between the slip rings 17, 18, 19 and the line, they can, with advantage be positive reactances. These additional impedances will increase the impedance of the secondary exciting circuits as compared with that of the secondary working circuits and thus oppose the formation of working currents in said exciting circuits with the result that inaccuracies in the adjustments connected with the variable impedances 37, 38, 39 will have a much less disturbing effect. In fact the said adjustable impedances can be omitted altogether if the impedances 42, 43, 44 are made sufficiently large. In such case the energy required for producing the desired rotor excitation will be somewhat increased but the whole arrangement simplified. The exciting circuits can thus be free sufficiently from working currents at the cost of a somewhat greater loss in the exciting circuits. If the additional impedances 42, 43, 44 have reactances and particularly if they are included in the line frequency side of the exciting circuits then the phase of the auxiliary voltages must be adjusted accordingly and in such manner as to still cause the phase of the exciting voltages as they appear at the terminals of the secondary winding 7 to lead the working voltages appearing at these points by about 90 degrees.

Fig. 3 differs from Fig. 2 in that there is no provision for changing the phase of the voltages impressed on the slip rings of the exciter, but the magnitude of these voltages can be adjusted by means of the three-phase transformer 32. It further differs from Fig. 2 in that provision is made to displace the commutator brushes in response to load variations. In operating this machine, the commutator brushes are so located that when the asynchronous motor runs at no load there is nothing but exciting current in the exciting circuits of the secondary 7 thereof, which means that the brush voltages impressed on the slip rings 8, 8', 8" lead the working voltages of said winding by a little more than ninety degrees. As the load increases, the commutator brushes 20, 21, 22 are moved in such a direction as to cause the voltages appearing at said brushes to lead the working voltages in 7 by an ever increasing angle and this movement of the commutator brushes is brought about by a three-phase motor or relay, the stator windings 29, 30, 31 of which are included in series with the primary terminals of the asynchronous motor. These magnetizing windings co-operate with a squirrel cage or similar rotor 28 and cause it to exert an ever increasing torque which is transmitted to the brush carrier 16 by means of the shaft 40 and the gear 41 and which moves the commutator brushes in the desired direction and at the desired rate in opposition to the effort of the spring 27 which tends to bring the brush rocker arm back against the stop 26, in which position the commutator brushes supply voltages of correct phase for the no-load condition of the asynchronous motor. In this embodiment of my invention the secondary exciting circuits of the winding 7 of the asynchronous motor are kept practically free from load currents by the relay 28, but the magnitude of the excitation produced by the secondary of said motor changes under such conditions with changing position of the commutator brushes, diminishing as the load increases. In view of this the motor may be over excited at no load and caused to operate with unity power factor at some selected load, for instance at full load, at maximum load or at any other load. The degree of maximum or minimum compensation can readily be adjusted by changing the magnitude of the voltages impressed on the slip rings of the exciter, which in this case can be achieved by means of the three-phase transformer 32.

The motor in Fig. 5 can be started in any manner suitable to a polyphase motor having a permanently shortcircuited secondary; the secondary exciting circuits determined by the slip rings 8, 8', 8" can be closed or open at starting. In normal operation the excitation is derived from the frequency converter 15, 16 the slip rings 17, 18, 19 of which are connected in series relation with the primary 5 of the motor by means of the series transformers 45, 46, 47. In order to oppose the formation of load currents in the secondary exciting circuits the impedance of said circuits per working volt generated therein is made higher than the impedance per working volt generated in the secondary working circuits which are determined by the points 6, 6', 6" of the secondary winding 7. This is achieved by the inclusion of the impedances 42, 43, 44 in the secondary exciting circuits. These impedances can be ohmic resistances or reactances. They are preferably ohmic resistances when included in the slip frequency and preferably reactances when included in the line frequency part of the exciting circuits. But the formation of load currents can also be opposed with the help of the frequency converter as connected in Fig. 5.

If the increased impedance per working volt generated is alone relied upon to sufficiently reduce the load currents in the rotor exciting circuits then the brushes 20, 21, 22 are set to introduce into the secondary exciting circuits by way of the slip rings 8, 8', 8" currents which lead the working voltages appearing at said slip rings by about 90 degrees.

The magnitude of the currents at the commutator brushes 20, 21, 22 will depend on the load current taken by the primary 5 of the motor and will consequently increase practically at the same rate as the load on the motor. Such an exciting current characteristic is seldom desirable and it is therefore well to destroy the proportionality between the primary load current and the current conveyed to the slip rings of the exciter and therefore the exciting current sent into the secondary of the motor. This is done by causing some part of the magnetic circuit of the exciter or of the series transformers or of both to approach saturation with less than full load value of the primary load current. In so far as the exciter is concerned, this can be very readily done in connection with the exciter structure shown in Fig. 6 for instance by working the iron located between the slots 53 at comparatively high magnetic densities. The advantage of this modified series rotor excitation lies in the fact that this rotor excitation can be automatically kept low at very light loads, when phase compensation is seldom of use, and can be automatically raised at overloads when the shunt type of excitation is liable to fall off thus lowering the power factor when it ought to be high.

When it is desired to dispense with the impedances 42, 43, 44 or to rely for the desired opposition to the formation of load currents in the secondary exciting circuits partly on said impedances and partly on the frequency converter 15, 16 then the commutator brushes thereof are so set that the auxiliary voltages impressed on the slip rings or introduced into the exciting circuits of the secondary winding 7 lead the working voltages generated in said winding, and appearing at the slip rings in question, by substantially more than 90 degrees. By working the exciter or the series transformers at high magnetic densities, as hereinbefore described, the exciting and the working-voltage-opposing components of the said voltages can be caused to increase slower than the increasing load and faster at light than at the heavier loads.

The motor shown in Fig. 7 can be started like an ordinary polyphase induction machine whether or not the brushes 58, 59, 60, 61 are connected to the points 8, 8', 8", 8''' of the secondary winding 7, but if the power factor of the machine is to be improved in normal operation by exciting same from secondary then the brushes 58, 59, 60, 61 must be suitably positioned and connected to 8, 8', 8", 8'''. It is known that in ordinary polyphase induction motors with revolving primary the flux produced by said primary revolves synchronously with respect to it and in a direction opposed to the rotation of the rotor. This flux therefore moves with slip frequency with respect to the secondary or stator and with line frequency with respect to all rotor windings inducing voltages of corresponding frequencies in rotor and stator. The line frequency voltages generated in the commuted winding 57 on the primary are converted to slip frequency voltages by the commutator and the stationary brushes 58, 59, 60, 61. The amplitude of the brush voltages is constant but their frequency changes with the slip and they are always of same frequency as the voltages generated in the secondary winding 7. If the brushes are so located that they produce voltages leading the working voltages in 7, appearing at the points 8, 8' 8" 8''' to which said brushes are connected, by about 90 degrees then said voltages can be used to excite the machine from the secondary and thus control its power factor. If said brush voltages lead the said working voltages by more than 90 degrees then they can be used to excite the motor from the secondary and to oppose the working-current-producing voltages generated in said secondary. The motor of Fig. 7 can therefore be operated at no load by setting the commutator brushes so as to cause the brush voltages to lead the secondary working voltages generated in the secondary exciting circuits by about 90 degrees and by displacing the brushes with increasing load so as to cause the phase lead of the brush voltages to increase with increasing load. The brushes can, for instance, be moved by means of the handle 63. As an alternative the brushes can be set in a position in which they will sufficiently excite the motor and sufficiently reduce the working currents in the exciting circuits at some selected load. In this case load currents will not be entirely excluded at all other loads but may be sufficiently reduced over a sufficient range of loads to make such setting useful in many cases.

To what extent the invention is taken advantage of depends on the preference of the user. When load currents are practically eliminated from the exciting circuits on the secondary, the conditions are very favorable. The magnetic circuit of the motor should preferably have no polar projections and may be designed as is usual in asynchronous polyphase motor practice, but in dimensioning the circuits, it should be remembered that the primary windings in such a motor carry nothing but working currents and not working and magnetizing currents as in the ordinary polyphase motor and that it is the secondary winding which carries working and exciting or magnetizing currents. Under the conditions named, the exciter if one is used, the commutator and its brushes need be dimensioned to take care of the exciting currents only and these are usually small in asynchronous polyphase motors mainly because of the usually very short air-gaps used. These exciting amperes may remain practically constant at all loads and the voltage on the commutator, whether the commutator is integral with the motor or located on an exciter may be chosen independently of the primary voltage and as low as desired.

Throughout this specification the term primary member is applied to that member which carries the windings connected to the supply, which windings carry the line working currents, and whether or not these primary windings produce the revolving flux of the motor which flux always revolves synchronously with respect to the primary member. The other member is referred to as secondary whether or not it carries a winding or windings which produce all or a part of the revolving flux.

It is well known that any motor can be operated as a generator provided it be driven by a prime mover at a suitable speed, and it is also generally recognized that non-asynchronous polyphase motors are no exception to this rule. It is further known that in the case of an asynchronous motor the voltages generated by the primary flux in any winding on the secondary change their direction when the machine passes from sub to super-synchronous speeds, thereby causing the machine to send working currents back to the line instead of drawing such currents from the supply. To keep the exciting circuits free from other than exciting currents is, of course, desirable whether the machine operates as a motor or as a generator. It is, therefore, to be understood that the terms used with reference to motor structures and operation are employed descriptively rather than limitatively.

While theories have been advanced in connection with the machines referred to herein, this has been done with a view to facilitating their description and understanding, but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

Having thus described the invention, what I claim is:

1. In a polyphase non-synchronous motor, a primary, a secondary, a winding on the secondary, two polyphase circuits through the secondary winding and each in inductive relation to the primary, means including one of said secondary polyphase circuits for producing at least part of the revolving field of the motor, and means for maintaining the currents in the revolving field producing secondary circuits approximately constant irrespective of motor load variations.

2. In a polyphase non-synchronous motor, a primary, a secondary, a winding on the secondary, two polyphase circuits through the secondary winding and each in inductive relation to the primary, means including one of said secondary polyphase circuits for producing at least part of the revolving field of the motor, and means for controlling the formation of working currents in the revolving field producing secondary circuits independently of the working currents in the other polyphase circuits on the secondary.

3. In a polyphase non-synchronous motor, a primary, a secondary, a winding on the secondary, two polyphase circuits through the secondary winding and each in inductive relation to the primary, means including one of said secondary polyphase circuits for producing at least part of the revolving field of the motor, and means for controlling the formation of working currents in the revolving field producing secondary circuits independently of other currents in said circuits.

4. In a polyphase non-synchronous motor, a primary, a secondary, a winding on the secondary, polyphase working and exciting circuits through the secondary winding and each in inductive relation to the primary, the working circuits being dimensioned to facilitate the formation of working currents therein, means including the secondary exciting circuits for producing at least part of the revolving field of the motor, and means for opposing the formation of working currents in the revolving field producing secondary circuits.

5. In a polyphase non-synchronous motor, a primary, a secondary, a winding on the secondary, two polyphase circuits through the secondary winding and each in inductive relation to the primary, means including one of said secondary polyphase circuits for producing at least part of the revolving field of the motor, and means for excluding working currents at a given load from those parts of the revolving field producing secondary circuits which are external to said secondary winding.

6. In a polyphase non-synchronous motor, a primary, a secondary, a winding on the secondary, two polyphase circuits through the secondary winding and each in inductive relation to the primary, means including one of said secondary polyphase circuits for producing at least part of the revolving field of the motor, and means for excluding working currents at a plurality of motor loads from those parts of the revolving field producing secondary circuits which are external to said secondary winding.

7. In a polyphase non-synchronous motor, a primary, a secondary, a winding on the secondary, means for non-inductively closing the secondary winding along a plurality of working axes per pole pair, and means for concurrently introducing into said secondary winding along a plurality of axes per pole pair displaced from the working axes, currents adapted to produce at least part of the revolving field of the motor.

8. In a polyphase non-synchronous motor, a primary, a secondary, a winding on the secondary, means for closing the secondary winding along a plurality of working axes per pole pair, the circuits so formed being dimensioned to facilitate the formation of working currents therein, means for introducing into said secondary winding along a plurality of axes per pole pair displaced from the working axes, currents adapted to produce at least part of the revolving field of the motor, and means for opposing the formation of working currents in the revolving field producing secondary circuits.

9. In a polyphase non-synchronous motor, a primary, a secondary, a winding on the secondary, means for closing the secondary winding along a plurality of working axes per pole pair, the circuits so formed being dimensioned to facilitate the formation of working currents therein, means for introducing into said secondary winding along a plurality of axes per pole pair displaced from the working axes, currents adapted to produce at least part of the revolving field of the motor, and means for keeping the currents in the revolving field producing secondary circuits approximately constant, irrespective of motor load variations.

10. In a polyphase non-synchronous motor, a primary, a secondary, a winding on the secondary, means without positive reactance for making the secondary winding inductively responsive to the primary along a plurality of working axes per pole pair, thus forming in normal operation a plurality of secondary working circuits dimensioned to facilitate the formation of working currents therein, and means for concurrently introducing into the secondary winding along a plurality of other axes per pole pair and at neutral points of the said working circuits, currents adapted to produce at least part of the revolving field of the motor.

11. In a polyphase non-synchronous motor, a primary, a secondary, a winding on the secondary, means for making the secondary winding inductively responsive to the primary along a plurality of working axes per pole pair, thus forming a plurality of secondary working circuits dimensioned to facilitate the formation of working currents therein, means for introducing into the secondary winding along a plurality of other axes per pole pair and at neutral points of the said working circuits, currents adapted to produce at least part of the revolving field of the motor, and means for opposing the formation of working currents in the revolving field producing secondary circuits.

12. In a polyphase non-synchronous motor, a primary, a secondary, a winding on the secondary, two polyphase circuits through the secondary winding and each in inductive relation to the primary, one of said polyphase circuits being dimensioned to facilitate the formation of working currents therein, a source of auxiliary voltages, frequency changing means, means comprising the other secondary polyphase circuits the frequency changing means and the auxiliary voltages adapted to produce at least part of the revolving field of the motor, and means for opposing the formation of working currents in the revolving field producing secondary circuits.

13. In a polyphase non-synchronous motor, a primary, a secondary, a winding on the secondary, two polyphase circuits through the secondary winding and each in inductive relation to the primary, means including one of said secondary polyphase circuits for producing at least part of the revolving field of the motor, and impedances in the polyphase exciting circuits adapted to raise the total impedance of these circuits per working volt generated therein above the total impedance of the secondary working circuits per working volt generated in said secondary working circuits.

14. In a polyphase non-synchronous motor, a primary, a secondary, polyphase working and exciting circuits on the secondary in inductive relation to the primary and adapted to allow working voltages to be generated in each of the secondary circuits, means for introducing auxiliary polyphase voltages into the secondary exciting circuits, impedances in circuit with the secondary exciting circuits, and means for keeping approximately constant at a plurality of motor loads, the sum of the working voltage generated in an exciting circuit and of the voltage at the terminals of the impedance in circuit with said exciting circuit.

15. In a polyphase non-synchronous motor, a primary, a secondary, a winding on the secondary, displaced polyphase working and exciting circuits through the secondary winding and each having working voltages generated within itself, means for introducing auxiliary polyphase voltages into the secondary exciting circuits, positive reactances in circuit with the secondary exciting circuits, and means for keeping approximately constant at a plurality of motor loads, the sum of the working voltage generated in an exciting circuit and of the voltage at the terminals of the positive reactance in circuit with said exciting circuit.

16. In a polyphase non-synchronous motor, a primary, a secondary, a winding on the secondary, polyphase working and exciting circuits through the secondary winding and each having working voltages generated within itself, the working circuits being dimensioned to facilitate the formation of working currents therein, frequency converting means external to the motor, means including the frequency converting means for introducing slip frequency polyphase auxiliary voltages into the secondary exciting circuits, adapted to produce at least part of the revolving field of the motor, and means for keeping the currents in the revolving field producing secondary circuits approximately constant irrespective of motor load variations.

17. In a polyphase non-synchronous motor, a primary, a secondary, a winding on the secondary, polyphase working and exciting circuits through the secondary winding and each having working voltages generated within itself, the working circuits being dimensioned to facilitate the formation of working currents therein, frequency converting means external to the motor, means including the frequency converting means for introducing slip frequency polyphase auxiliary voltages into the secondary exciting circuits adapted to produce at least part of the revolving field of the motor, and means for opposing the formation of working currents in the revolving field producing secondary circuits.

18. In a polyphase non-synchronous motor, a primary, a secondary, a winding on the secondary, polyphase working and exciting circuits through the secondary winding and each having working voltages generated within itself, frequency converting means external to the motor, means including the frequency converting means for introducing into the secondary exciting circuits polyphase auxiliary voltages of slip frequency which lead the working voltages generated in said circuits by substantially more than 90 degrees, positive reactances in the exciting circuits, and means for keeping approximately constant at a plurality of loads, the sum of the working voltage generated in an exciting circuit and of the voltage at the terminals of the positive reactance in circuit with said exciting circuit.

19. In a polyphase non-synchronous motor, a primary, a secondary, a winding on the secondary, displaced polyphase working and exciting circuits through the secondary winding and each having working voltages generated within itself, means for introducing into the secondary exciting circuits auxiliary polyphase voltages of same frequency as the working voltages generated in said circuits, said auxiliary voltages being adapted to produce at least part of the revolving field of the motor, and variable reactances in the exciting circuits which increase when the working voltages in said circuits decrease and vice versa.

20. In a polyphase non-synchronous motor, a primary, a secondary, polyphase working and exciting circuits on the secondary and in inductive relation to the primary, the working circuits being dimensioned to carry working ampereturns in excess of the working ampereturns carried by the exciting circuits and thus control the magnitude of the slip of the motor, and means including the exciting circuits for producing at least part of the revolving flux of the motor.

21. In a polyphase non-synchronous motor, a primary, a secondary, polyphase working and exciting circuits on the secondary and in inductive relation to the primary, the working and exciting circuits being so dimensioned that for a given slip there are more ampereturns generated in said working than in said exciting circuits, and means including the exciting circuits for producing at least part of the revolving flux of the motor.

22. In a polyphase non-synchronous motor, a primary, a secondary, an $n$-phase winding on the secondary, frequency converting means, means for shortcircuiting alternate phase connections of said secondary winding in normal operation adapted to form $n/2$ phase working circuits in inductive relation to the primary, and means including said frequency converting means and the other phase connections of said secondary adapted to form $n/2$ phase exciting circuits and produce in normal operation at least part of the revolving field of the motor from the secondary.

23. In a polyphase non-synchronous motor, a primary, a secondary, an $n$-phase winding on the secondary, frequency converting means, means for shortcircuiting some of the phase connections of said secondary winding in normal operation adapted to form working circuits in inductive relation to the primary, and means comprising said frequency converting means and the remaining phase conections of said secondary winding adapted to form exciting circuits in inductive relation to the primary and to produce in normal operation at least part of the revolving field of the motor from the secondary.

24. In a polyphase non-synchronous motor, a primary, a secondary, a winding on the secondary provided with a plurality of taps, frequency converting means, means for short circuiting some of the taps of said secondary winding in normal operation adapted to form working circuits in inductive relation to the primary, and means comprising said frequency converting means and the remaining taps of said secondary winding adapted to form exciting circuits in inductive relation to the primary and to produce in normal operation at least part of the revolving field of the motor from the secondary, at least part of the conductors on the secondary being included in working as well as in exciting circuits.

25. In a polyphase non-synchronous motor, a primary, a secondary, polyphase working and exciting circuits on the secondary and in inductive relation to the primary, means in series relation with the primary and including the polyphase exciting circuits on the secondary, adapted to produce at least part of the revolving field of the motor, and impedances in said exciting circuits.

26. In a polyphase non-synchronous motor, a primary, a secondary, a winding on the secondary, polyphase working and exciting circuits through the secondary winding and each in inductive relation to the primary, means in series relation with the primary and including the polyphase exciting circuits on the secondary, adapted to produce at least part of the revolving field of the motor, and means for destroying the proportionality between the currents in the primary and the currents in the secondary exciting circuits.

27. In a polyphase non-synchronous motor, a primary, a secondary, polyphase working and exciting circuits on the secondary and in inductive relation to the primary, the working circuits being dimensioned to facilitate the formation of working currents therein, frequency changing means, means including said frequency changing means for connecting the secondary exciting circuits in series relation with the primary, adapted to produce at least part of the revolving field of the motor, and means for opposing the formation of working currents in said exciting circuits.

28. In a polyphase non-synchronous motor, a primary, a secondary, polyphase working and exciting circuits on the secondary and in inductive relation to the primary, the working circuits being dimensioned to facilitate the formation of working currents therein, frequency changing means, means including said frequency changing means for connecting the secondary exciting circuits in series relation with the primary, adapted to produce at least part of the revolving field of the motor, means for opposing the formation of working currents in said exciting circuits, and means for destroying the proportionality between the currents in the primary and the currents in the secondary exciting circuits.

29. In a polyphase non-synchronous motor, a primary, a secondary, polyphase working and exciting circuits on the secondary and in inductive relation to the primary, the working circuits being dimensioned to facilitate the formation of working currents therein, frequency changing means, means including said frequency changing means for connecting the secondary exciting circuits in series relation with the primary, adapted to produce at least part of the revolving field of the motor, and means for keeping the currents introduced into the exciting circuits through the frequency changing means nearly constant over a range of loads.

30. In a polyphase non-synchronous motor, a primary, a secondary, polyphase working and exciting circuits on the secondary and in inductive relation to the primary, the working circuits being dimensioned to facilitate the formation of working currents therein, frequency changing means, means including said frequency changing means for connecting the secondary exciting circuits in series relation with the primary, adapted to produce at least part of the revolving field of the motor, means for keeping the currents introduced into the exciting circuits through the frequency changing means nearly constant over a range of loads, and means for opposing the formation of working currents in said exciting circuits.

In testimony whereof I affix my signature this 12th day of December, 1925.

VALÈRE A. FLYNN.

CERTIFICATE OF CORRECTION.

Patent No. 1,604,902, granted October 26, 1926.

to VALÈRE A. FYNN.

It is hereby certified that error appears in the printed specification of the above mentioned patent requiring correction as follows: Page 2, line 99, for the word "asynchronous" read "synchronous"; page 13, the signature of the patentee at the end of the specification was erroneously printed as "Valère A. Flynn" whereas said signature should have been printed as "Valère A. Fynn"; and that the said Letters Patent should be read with these corrections therein that the same may conform to the record of the case in the Patent Office.
Signed and sealed this 22nd day of February, A. D. 1927.

Seal.

M. J. Moore,
Acting Commissioner of Patents.